(12) United States Patent
Suman (10) Patent No.: US 11,994,215 B2
(45) Date of Patent: May 28, 2024

(54) SHAFT SEALING SYSTEM

(71) Applicant: Andrew W. Suman, Waterford, MI (US)

(72) Inventor: Andrew W. Suman, Waterford, MI (US)

(*) Notice: Subject to any disclaimer, the term of this patent is extended or adjusted under 35 U.S.C. 154(b) by 288 days.

(21) Appl. No.: 17/224,186

(22) Filed: Apr. 7, 2021

(65) Prior Publication Data
US 2021/0222776 A1 Jul. 22, 2021

Related U.S. Application Data

(63) Continuation-in-part of application No. PCT/US2019/055108, filed on Oct. 8, 2019.

(60) Provisional application No. 62/742,718, filed on Oct. 8, 2018.

(51) Int. Cl.
| | |
|---|---|
| *F16J 15/32* | (2016.01) |
| *F16J 15/3212* | (2016.01) |
| *F16J 15/3224* | (2016.01) |
| *F16J 15/328* | (2016.01) |
| *F16J 15/3284* | (2016.01) |
| *F16J 15/54* | (2006.01) |

(52) U.S. Cl.
CPC ....... *F16J 15/3284* (2013.01); *F16J 15/3212* (2013.01); *F16J 15/3224* (2013.01); *F16J 15/328* (2013.01); *F16J 15/545* (2013.01)

(58) Field of Classification Search
CPC .... F16J 15/328; F16J 15/3224; F16J 15/3212; F16J 15/3284; F16J 15/545; F16J 15/3232; F16J 15/324; F16J 15/447; F16J 15/4472; F16J 15/4474; F16J 15/4476; F16J 15/4478
See application file for complete search history.

(56) References Cited

U.S. PATENT DOCUMENTS

| | | | | | |
|---|---|---|---|---|---|
| 5,314,304 | A | * | 5/1994 | Wiebe | F01D 11/122 415/174.4 |
| 6,012,723 | A | * | 1/2000 | Beeck | H02K 5/124 277/355 |
| 8,387,993 | B2 | * | 3/2013 | Horton | F16J 15/3264 277/569 |
| 8,894,289 | B2 | * | 11/2014 | Sakurai | F16C 33/7863 384/486 |
| 2007/0071990 | A1 | * | 3/2007 | Suman | B23K 35/36 428/548 |

(Continued)

*Primary Examiner* — Eugene G Byrd
*Assistant Examiner* — L. Susmitha Koneru
(74) *Attorney, Agent, or Firm* — Eschweiler & Potashnik, LLC (57) ABSTRACT

A radial shaft seal includes a powder coating on a shaft and a sealing lip that lands on the powder coating. The powder coating is formed of a thermosetting resin and a filler material. The filler material has a melting point above the cure temperature of the thermosetting resin. The powder coating may be porous. The powder coating may be made up of dry powder particles adhered to one-another with spaces in between. The filler may be present in an amount between 15% and 35% within the individual particles. The powder coating is adapted to wear away at locations of maximum interference with the sealing lip while continuing to provide a durable seal. This wear behavior compensates for shaft wobble.

12 Claims, 7 Drawing Sheets

(56) References Cited

U.S. PATENT DOCUMENTS

| | | | |
|---|---|---|---|
| 2007/0132193 A1* | 6/2007 | Wolfe | F16J 15/445 |
| | | | 277/415 |
| 2010/0025939 A1* | 2/2010 | Horton | F16J 15/16 |
| | | | 277/560 |
| 2014/0093200 A1* | 4/2014 | Sakurai | F16C 33/76 |
| | | | 384/472 |
| 2019/0113080 A1* | 4/2019 | Kamiya | F16J 15/447 |

* cited by examiner

SHAFT SEALING SYSTEM

REFERENCE TO RELATED APPLICATIONS

This application claims the benefit of U.S. Provisional Application No. 62/742,718, filed on Oct. 8, 2018 and PCT/US19/55108, file Oct. 8, 2019 the contents of which applications are incorporated herein by reference in their entirety.

FIELD

The present disclosure relates to radial shaft seals.

BACKGROUND

Radial shaft seals are widely employed in machines having rotating, oscillating, or reciprocating shafts. Radial shaft seals are intended to retain lubricants and prevent lubricant contamination while having low friction. Challenges that contribute to radial shaft seals being unable to perform these functions ideally include non-uniform shaft surfaces, shafts that are not perfectly round, and imperfections that cause shafts to wobble about their intended axis of rotation. Maintenance costs and premature wear associated with non-ideal radial shaft seals are enormous, which has created a long felt need for better radial shaft seals.

SUMMARY

One aspect of the invention is a radial shaft seal that includes a powder coating over an outer surface of a shaft and a sealing lip that abuts the powder coating to form the seal. The powder coating is formed from a powder that includes a thermosetting resin and a filler material. The filler material has a melting point above the cure temperature of the thermosetting resin. The thermosetting resin forms a matrix and the filler material affects hardness of that matrix and imparts desirable wear characteristics. The powder coating is adapted to wear away at locations of maximum interference with the sealing lip but is sufficiently stable to provide a durable sealing system. This wear behavior can compensate for shaft wobble and the sealing system can compensate for shaft wear. In some of these teachings the shaft wobbles as it rotates to produce a radial extent that varies by at least 10 μm as the shaft rotates absent the powder coating.

In some of these teachings, the powder coating is applied relatively thickly. In some of these teaching the powder coating has a thickness greater than 20 μm. In some of these teachings, the powder coating has a thickness of at least about 40 μm. These thicknesses allow the portion of the powder coating that does not wear away to reshape the shaft compensating for surface defects, non-circularity, and wobble.

In some of these teachings, the sealing lip wears a trench into the powder coating. The sealing lip then mates with the trench to provide increased contact area with the sealing lip, providing benefits like those of a labyrinth seal. In some of these teachings, the trench makes the contact area between the sealing lip and the powder coating at least 50 percent greater than it would be if the powder coating had a uniform thickness on the shaft. In some of these teachings, the trench has a depth that is at least 25% of the trench width. In some of these teachings, the trench wears down to the outer surface on which the powder coating is formed. An oil seal may be formed by contact between the sealing lip and the powder coating at on side of the trench. A relatively thick powder coating facilitates the formation of these structures. In some of these structures, the sealing lip is one of a plurality of sealing lips that mate with a plurality of trenches in the powder coating to form a labyrinth seal. This structure may be produced with one sealing ring having multiple sealing lips or by multiple sealing rings each providing one sealing lip.

In some of these teachings, the powder coating includes a first layer proximate the shaft and a second layer more distal from the shaft. The first layer is more wear resistant that the second layer. This structure may limit the depth to which a trench forms in the powder coating. On the other hand, in some of these teachings the sealing lip is allowed to wear the powder coating down to the shaft.

In some of these teachings, an elastomeric ring provides the sealing lip. In some of these teaching, a nitrile ring provides the sealing lip. In some of these teachings, the radial shaft seal further comprises a garter spring that biases the sealing lip against the shaft. These elastomeric and spring forces keep space from developing between the sealing lip and the underlying surface even as the powder coating wears.

In some of these teachings, the powder coating is formed from dry powder in which the filler is present in an amount from 15 to 35 volume percent based on the volume of the dry powder. In some of these teachings, the powder coating is formed from a powder of particles that individually have the filler in an amount from 15% to 35% by volume. In some of these teaching, the dry powder is formed from a process that includes melt-mixing the thermosetting resin and the filler material to form a composite, cooling the composite, and breaking up the cooled composite to form the dry powder. In some of these teachings, the powder coating is formed by electrostatic deposition of the dry powder on the shaft. In some of these teachings, the filler is graphite.

In some of these teachings, the powder coating is porous. In some of these teachings, the powder coating has a porosity in the range from 2% to 80%. In some of these teaching, the powder coating has a porous structure that is formed by the particles of the dry powder adhered to one another with spaces in between. In some of these teaching, that structure is formed by curing the dry powder in such a way that the dry powder particles sinter but do not flow sufficiently to lose their discrete identities. In particular, a surface of the powder coating has roughness that includes hills corresponding to individual particles of the dry powder and valleys between the hills. The porous structure allows the powder coating to hold oil and results in lower friction.

In some of these teaching, a liquid primer is applied to the shaft prior to coating the shaft with the dry powder. The liquid primer may include a second thermosetting resin and a solvent. The dry powder is applied over the liquid primer prior to drying or curing the liquid primer. In some of these teachings, the dry powder is applied over the liquid primer while the liquid primer is still liquid. The dry powder and the liquid primer are cured together to form a dry powder film lubricant. The dry powder film lubricant includes a non-porous polymer matrix formed from the first thermosetting resin in a layer proximate the shaft. The dry powder particles adhered to one another may form a porous layer more distal from the shaft. The resulting dry powder film lubricant may exhibit superior adhesion and wear properties compared to one formed without the liquid primer. A porous powder coating according to the present teachings may provide corrosion resistance. The dry powder film lubricant that includes a non-porous polymer layer underneath the powder coating provides superior corrosion resistance.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor's will be conveyed to one of ordinary skill in the art by the following detailed description together with the drawings. The specifics disclosed herein may be generalized, narrowed, and combined in various ways with the ultimate statement of what the inventor claims as his invention being reserved for the claims that follow.

BRIEF DESCRIPTION OF THE DRAWINGS

Aspects of the present disclosure are best understood from the following detailed description when read with the accompanying figures. In these figures, some features are not drawn to scale. In fact, the dimensions of various features may be arbitrarily increased or reduced for clarity of illustration.

FIG. 5 illustrates the machine of FIG. 4 after the radial shaft seal has broken in.

DETAILED DESCRIPTION

Figure 1:
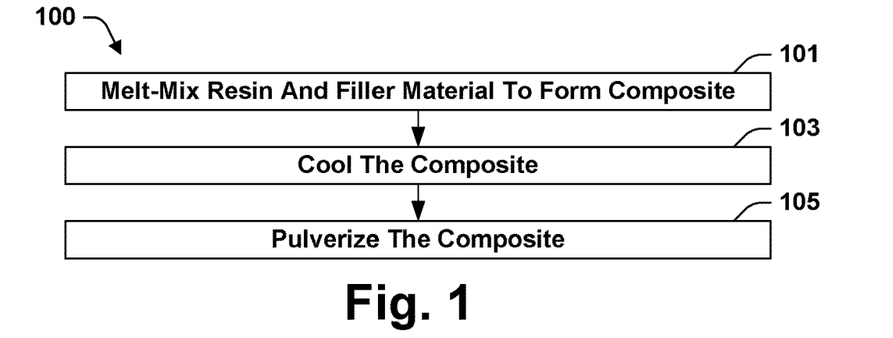
FIG. 1 is flow chart of a process that may be used in accordance with some aspects of the present teachings to form a dry powder.

FIG. 1 is a flow chart of a process 100 for forming a dry powder. The process includes act 101, melt-mixing a thermosetting resin and a filler material to form a composite, act 103, cooling the composite, and act 105, pulverizing the composite to form the dry powder. The resin may be part of a resin system that includes one or more of a curing agent, a hardener, an inhibitor, and plasticizer. Any suitable thermosetting resin may be used. Examples of thermosetting resins that may be used include acrylic, allyl, epoxy, melamine formaldehyde, phenolic, polyamide, polyaryl sulphone, polyamide-imide, polybutadiene, polycarbonate, polydicyclopentadiene, polyester, polyphenylene sulphide, polyurethane, silicone, and vinyl ester resins and mixtures thereof. The composite may have the resin in an amount that is 35% or more by volume.

The filler material preferably has a melting point above the cure temperature of the thermosetting resin. In some of these teachings, the filler material is a solid lubricant. Examples of solid lubricants that may be used as the filler material include graphite, PTFE, polyamide, polyamide imide, polyimide, boron nitride, carbon monofluoride, molybdenum disulphide, talc, mica, kaolin, the sulfides, selenides, and tellurides of molybdenum, tungsten, titanium, tungsten disulfide, the like, and combinations thereof. The mixture preferably has the filler material in an amount that is 15 to 35 percent by volume. In some of these teachings the filler is at least 60% graphite. In some of these teachings the graphite particles have lengths in the range from 0.1 to 100 µm. In some of these teachings, the lengths are in the range from 7 to 30 µm. Some application benefit from the inclusion of clay in the filler. In some of these teachings, the filler is from 20% to 40% clay by volume. Examples of clays that are suitable for the filler include kaolin, mullite, montmorillonite, and bentonite.

The composite may be broken up to form the powder by any suitable process such as milling. The resulting powder preferably has a mean particle size in the range from 2 to 200 µm. For purposes of the present disclosure, particle sizes are the diameters of spheres having the same volume as the particles. More preferably, the mean particle size is in the range from 5 to 150 µm. Still more preferably the particle size is in the range from 10 to 80 µm. Smaller particles may be difficult to process. Larger particles may not adhere well when electrostatics are used. Preferably, the filler and the resin are both present in the individual particles of the powder.

Figure 2:
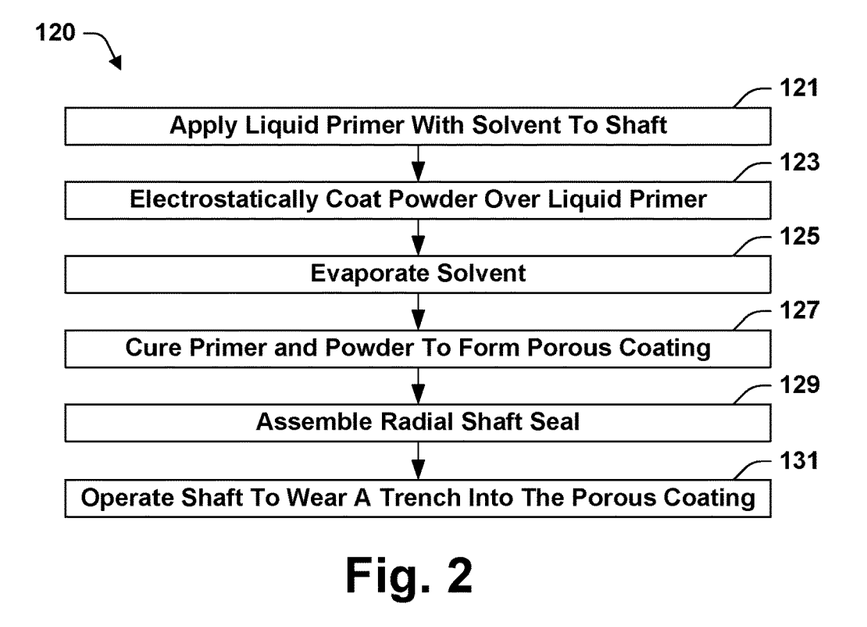
FIG. 2 is a flow chart of a process for coating a shaft in accordance with some aspects of the present teachings.
Figure 3:
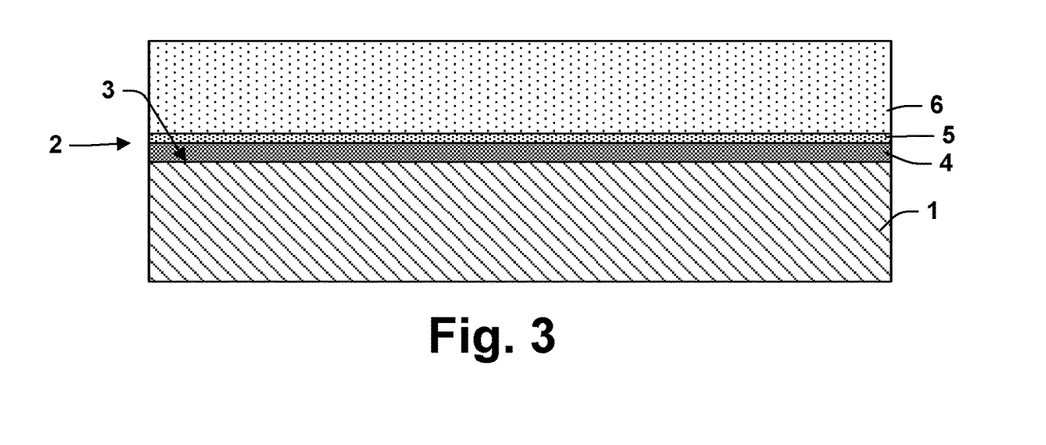
FIG. 3 illustrates a powder coating according to some aspects of the present teachings.

FIG. 2 is a flow chart of a process 120 in which the dry powder is used to form a powder coating 2 on a shaft 1 as shown in FIG. 3. The shaft 1 can be any type of shaft. The shaft 1 may be solid or hollow and may be one material or may comprise multiple layers of various materials. In some embodiments, the shaft 1 comprises a metal. Process 120 begins with act 121, applying a liquid primer to an outer surface 3 of the shaft 1. The liquid primer is optional, but can improve the adhesion and wear properties of the powder coating. The liquid includes a thermosetting resin. Optionally, the liquid also includes a solvent. The thermosetting resin can be any of the resins given as examples for making the dry powder. The thermosetting resin may make up 35% or more of the liquid primer by volume. The solvent is present in at least an amount sufficient to make the primer liquid if a solvent is needed for that purpose. Low boiling point solvents are preferred as are organic solvents. Examples of solvents that may be suitable for the liquid primer include methyl ethyl ketone (MEK), N-Methyl-2-pyrrolidone (NMP), turpentine, xylene, mineral spirits, turpenoid, toluene, dimethylfomamide, glycol ethers, ethylbenzene, n-butyl acetate, alcohols, acetone and combination thereof.

Process 120 continues with act 123 in which the dry powder is deposited over the liquid primer. The dry powder is preferably deposited before evaporating the solvent from the primer. The dry powder may be deposited by any suitable process. An electrostatic process is generally preferred for its ability to provide a thick and uniform coating of the dry powder. The dry powder may be sprayed on the shaft or the shaft may be placed in a fluidized bed of the dry powder.

Process 120 continues with act 125, evaporating the solvent and act 127, curing the liquid primer and the dry powder. FIG. 3 illustrates the powder coating 2 formed by this process. As shown in FIG. 3, powder coating 2 has three layers. A layer 4 closest to the outer surface 3 of shaft 1 is formed from the thermosetting resin of the liquid primer. The layer 4 may be non-porous. A layer 6, which is relatively distal from surface 3, may have a structure formed by particles of the dry powder adhered to one another with void spaces in between to produce a porosity in the range from 2%-80%. Layer 6 by itself may be considered a "powder coating" as that term is used in the claims. Porosity is not strictly required, but generally improves the friction and wear characteristics of powder coating 2. Between layers 4 and 6 is an interfacial later 5 formed by interactions between the dry powder particles and the liquid primer. These interactions may include one or more of sinking, capillary action, and partial dissolution.

Figure 4:
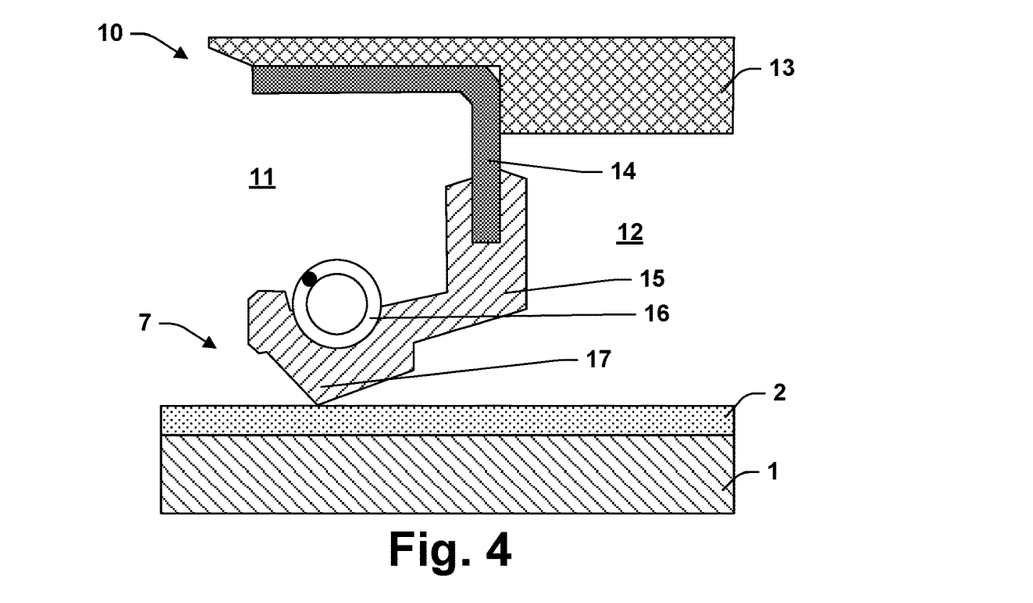
FIG. 4 illustrates a machine with a radial shaft seal according to some aspects of the present teachings.

Process 120 continues with act 129, assembling the radial shaft seal 7 to produces a structure as shown in FIG. 4. Radial shaft seal 7 includes powder coating, which coats shaft 1, nitrile ring 15, and garter spring 16. A sealing lip 17 of nitrile ring 15 lands on powder coating 2. Radial shaft seal 7 is shown in a machine 10. Together with housing 13 and mounting piece 14, radial shaft seal 7 maintains isolation between an oil side 11 and an air side 12. The isolation may be sufficient to maintain a pressure differential as well as keep oil in and contaminants out.

Figure 5:
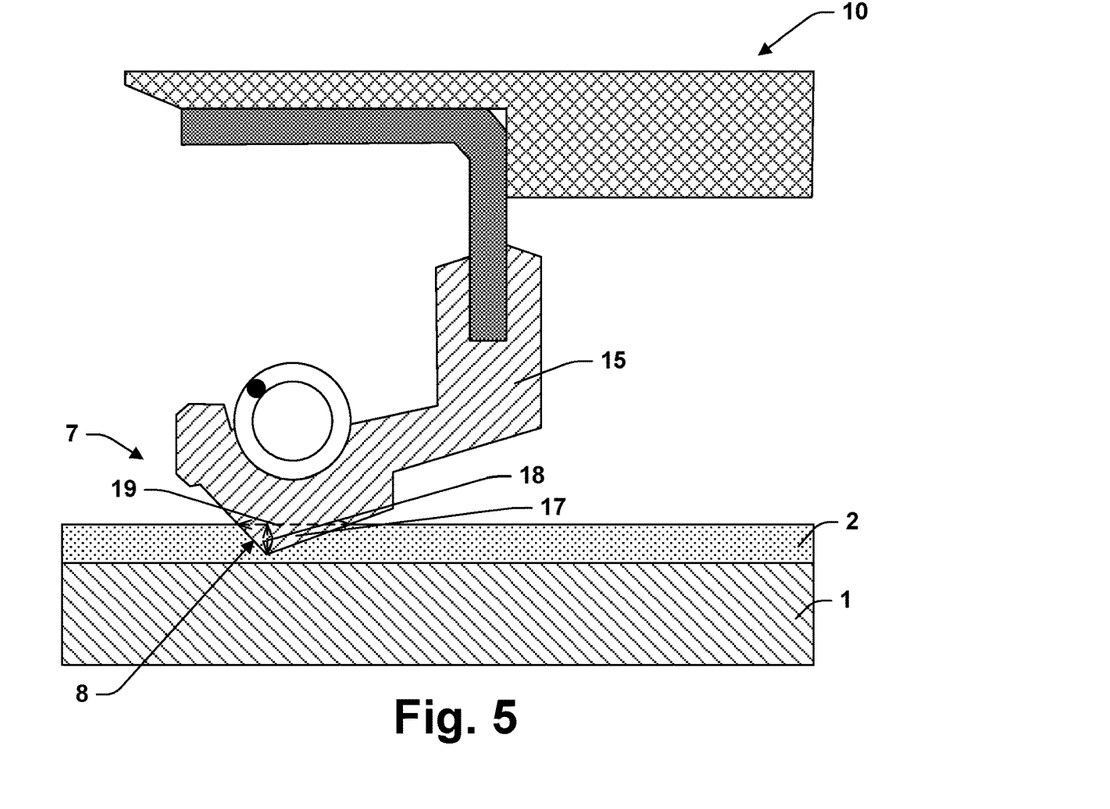

Process 120 continues with act 131, operating shaft 1 to wear a trench 8 into powder coating 2 as show in FIG. 5. Trench 8 develops a shape that mates with sealing lip 17. Wearing trench 8 into powder coating 2 greatly increases the contact area between sealing lip 17 and powder coating 2. Preferably, the wear occurs primarily during a first operating cycle of the machine 10 and is greatly diminish during subsequent operating cycles. The wear may become limited in one of several ways. One possibility is that the increase in contact area between sealing lip 17 and powder coating 2 reduces the normal force between sealing lip 17 and powder coating 2 sufficiently to greatly reduce the wear rate. Another is that sealing lip 17 wears trench 8 down to a layer of powder coating 2 that has a higher wear resistance than the uppermost layer of powder coating 2. Another is that sealing lip 17 wears completely through the coating 2 until the sealing lip 17 pressed against an outer surface 57 around the shaft 1 as shown in FIG. 9.

Optionally, powder coating 2 receives two layers of powder, one that produces a low wear resistance upper layer and a second that produces a higher resistance layer underneath. A variety of parameters may be adjusted to produce a desired degree of wear resistance. Useful parameters to adjust include the identity of the thermosetting resin, the cure temperature, the amount of filler, the composition of the filler including the amount of clay the filler contains, and the porosity of the coating, which may be controlled through the size distribution of the dry powder particles.

Figure 9:
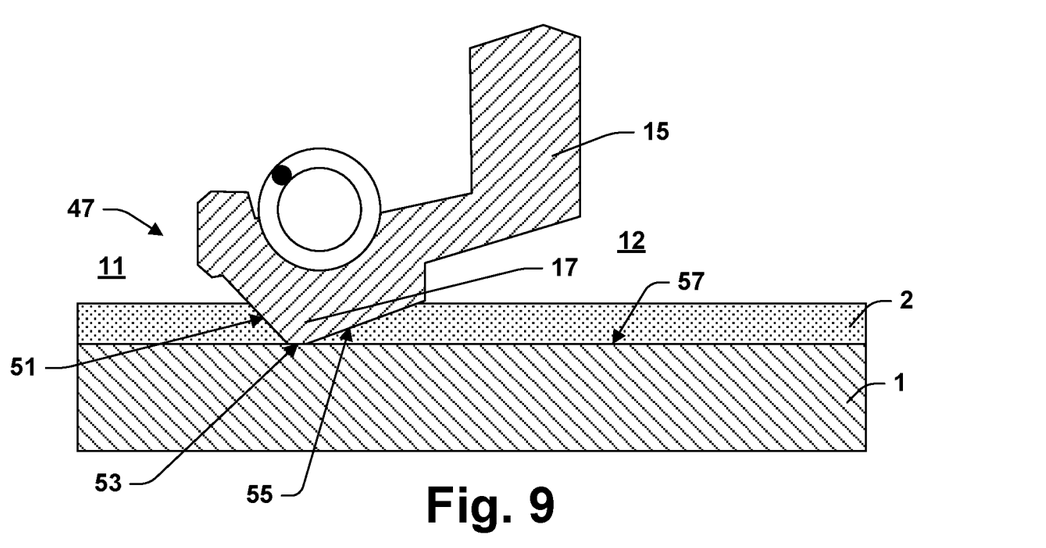
FIG. 9 illustrates a shaft seal according to some aspects of the present teachings.

In some embodiments, powder coating 2 is adapted to allow sealing lip 17 to wear trench 8 down to shaft 1 resulting in a radial shaft seal 47 having the configuration shown in FIG. 9. As shown in FIG. 9, in the radial shaft seal 47, the sealing lip 17 of the nitrile ring 15 forms an interface 51 with the coating 2 on oil side 11, an interface 53 with an outer surface 57 over the shaft 1 where the coating 2 has worn completely through, and an interface 55 with the coating 2 on air side 12. It has been found that sealing lip 47 is highly effective for preventing sand on air side 12 from working its way through to oil side 11 even after the sealing lip 17 has worn completely through the coating 2. Sand particles may be trapped with the coating 2 adjacent the interface 55. Oil sealing may occur primarily on the interface 51 or on the interface 55 depending on the relative pressures of the air side 12 and the oil side 11.

Figure 6:
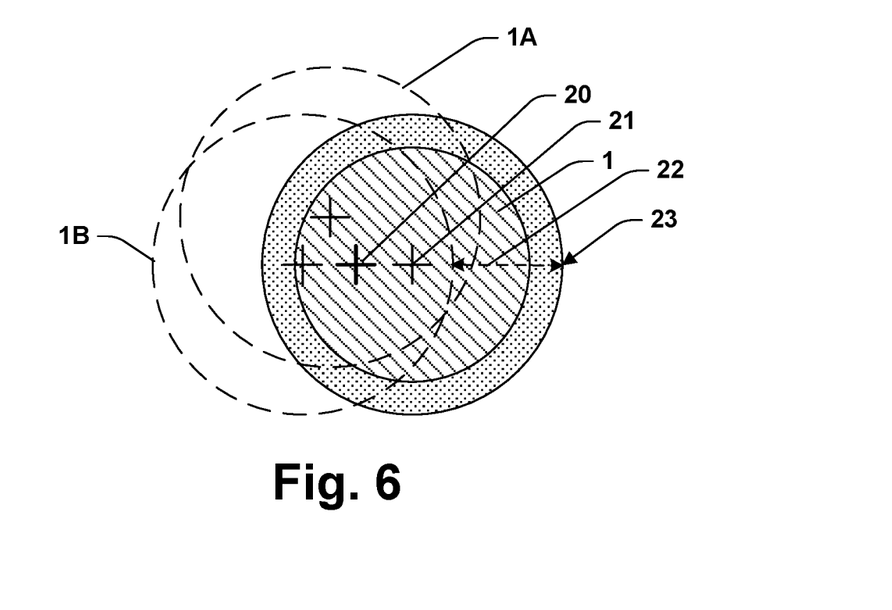
FIG. 6 illustrates a shaft with a powder coating according to some aspects of the present teachings.
Figure 7:
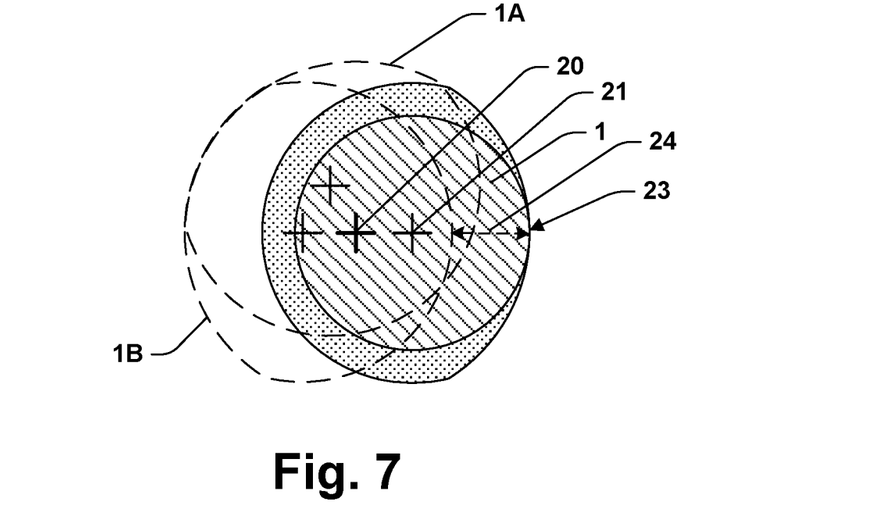
FIG. 7 illustrates the shaft of FIG. 6 after the powder coating has worn in to mitigate wobble.

FIG. 6 illustrates how powder coating 2 functions to mitigate wobble of shaft 1. about its ideal axis of rotation. Shaft 1 has an axis 21 that is offset from its ideal axis of rotation 20. This causes shaft 1 to wobble as shown by the outlines 1A and 1B, which illustrate the location of shaft 1 after 120 degrees and 180 degrees of rotation, respectively. Wobble causes a radially fixed location 23 on the surface of shaft 1 to have a radial extent from axis of rotation 20 that has a radial variation 22 that may be 10 μm or more. Powder coating 2 may wear to the configuration shown in FIG. 7, whereby the radial variation 22 is reduced to a radial variation 24.

Figure 8:
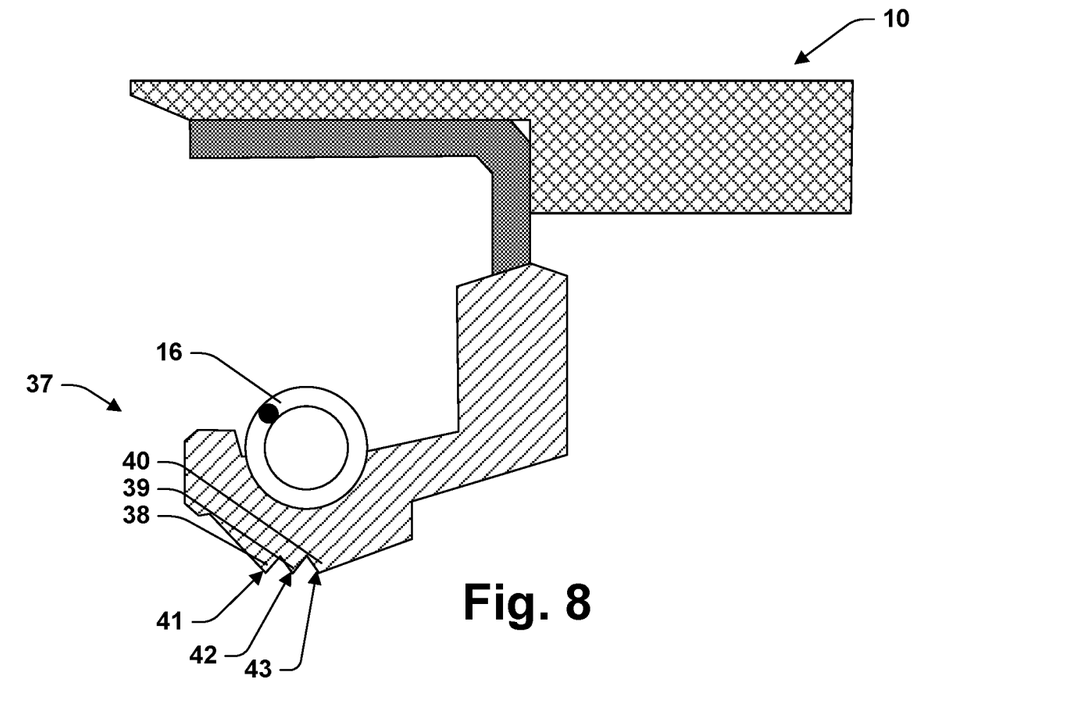
FIG. 8 illustrates a machine with a radial shaft seal according to some other aspects of the present teachings.

FIG. 8 illustrates machine 10 with radial shaft seal 37, which is a variation on radial shaft seal 7 of FIG. 5. Radial shaft seal 37 differs from radial shaft seal 7 in that radial shaft seal 37 has sealing lips 38, 39, and 40. These sealing lips all land on powder coating 2. Over an initial operating cycle of the machine 10, sealing lips 38, 39, and 40 wear trenches 41, 42, and 43 into powder coating 2. Sealing lips 38, 39, and 40 then mate with trenches 41, 42, and 43 to form a labyrinth seal.

Figure 10A:
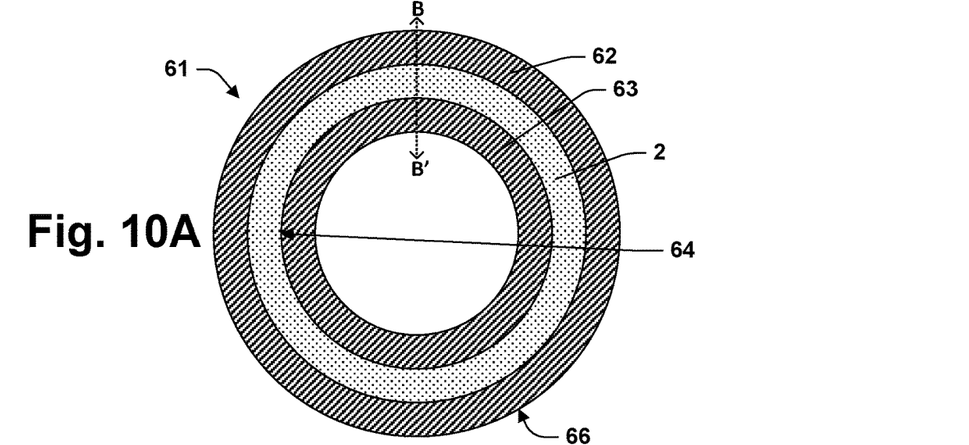
FIG. 10A is an end view of a repair sleeve according to some aspects of the present teachings.
Figure 10B:
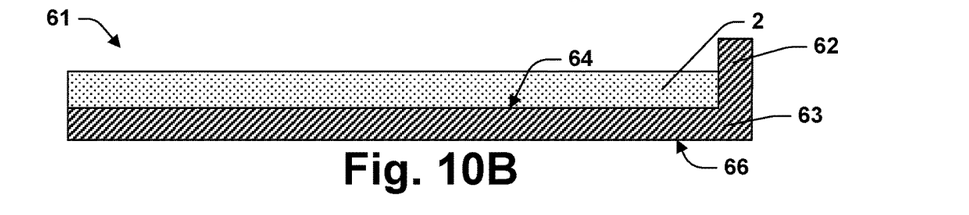
FIG. 10B is a cross-sectional side view of the repair sleeve of FIG. 10A taken along the line B-B' of FIG. 10A

FIGS. 10A and 10B illustrate a radial shaft seal repair sleeve 61 in accordance with some embodiments of the present disclosure. The radial shaft seal repair sleeve 61 includes a body 63 having a cylindrical inner surface 66 and an outer surface 64 on which a powder coating 2 is formed. The body 63 may be generally cylindrical but have a lip 62 or the like to facilitate press fitting the radial shaft seal repair sleeve 61 around a shaft. The body 63 may be a metal such as stainless steel or the like, or may be made of any other suitable material. The body 63 may be thin. In some embodiments, the body 62 has a thickness in the range from about 100 to about 1000 microns. An elastomeric material may be applied to the cylindrical inner surface 66 to facilitate sealing around a worn shaft. The powder coating 2 may have features as described above.

Figure 11:
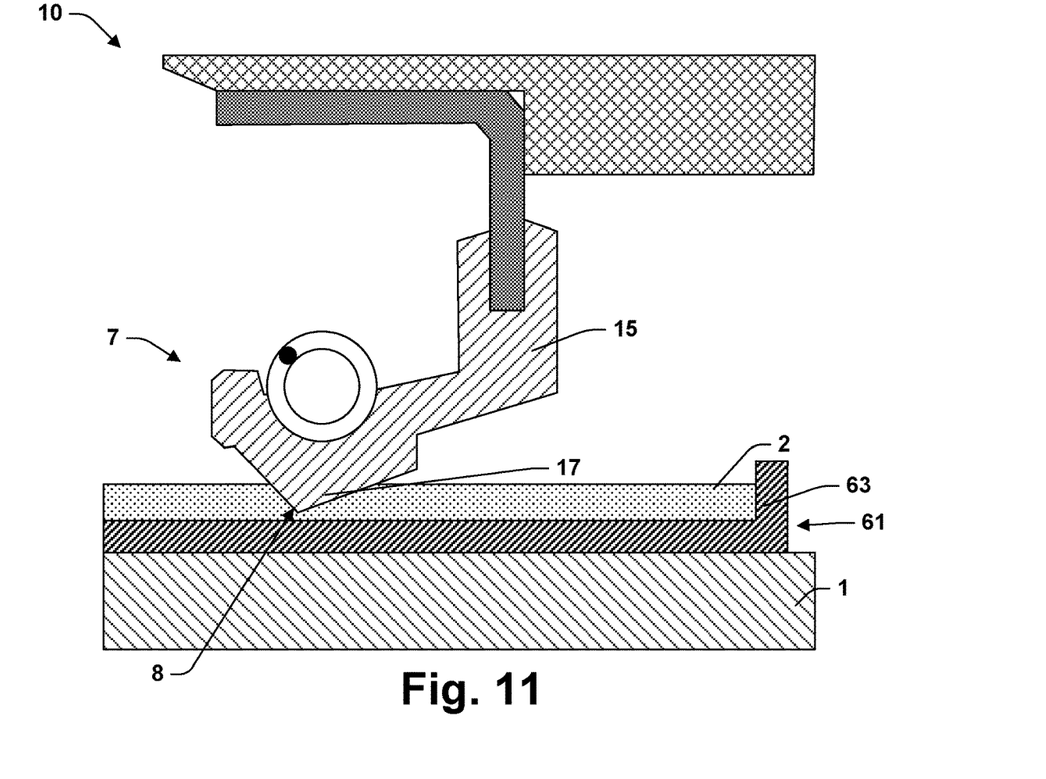
FIG. 11 illustrates a machine with the repair sleeve of FIGS. 10A and 10B.

FIG. 11 illustrates the machine 10 with the radial shaft seal repair sleeve 61. The radial shaft seal repair sleeve 61 has been fit around the shaft 1 and the machine 10 operated until the sealing lip 17 has worn the trench 8 into the powder coating 2. The trench 8 forms within a short break-in period after which the dimension of the trench 8 remain stable for a much longer period of operation.

Figure 12:
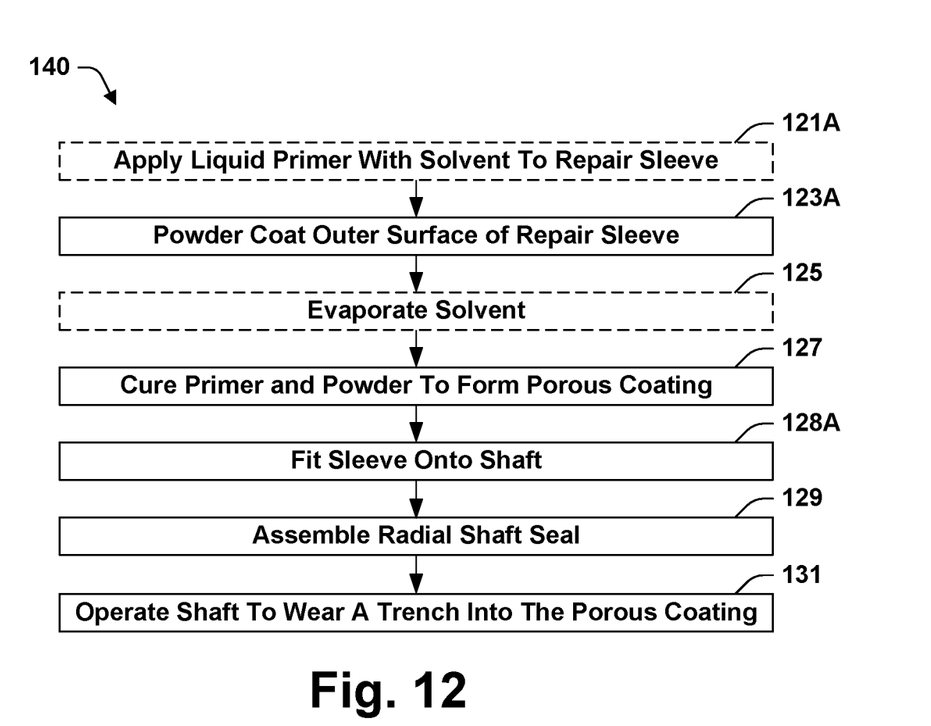
FIG. 12 is a flow chart of a process of making a repair sleeve and installing it in according to some aspects of the present teachings.

FIG. 12 provides a flow chart of a process 140 of making a repair sleeve according to the present teachings and installing it on a shaft to form a radial shaft seal according to the present teachings. The process 140 is generally similar to the process 120 except that in the process 140 the outer surface to which the powder coating is applied is the outer surface 64 of the body 63 of the radial shaft seal repair sleeve 61.

The process 140 may begin with act 121A, applying a liquid primer to the outer surface 64. This step is optional as the liquid primer itself is optional. The process continues with act 123A, powder coating at least an outer surface 64 of the repair sleeve. In some embodiments, the powder coating is applied over the liquid primer which the liquid primer remains liquid. In some embodiments, the powder coating is applied directly to the shaft. In some embodiments, the powder coating is applied by electrostatic powder coating. Optionally, the shaft is coated with the powder by some other coating process. In some embodiments, the powder is the product of the process 100 of FIG. 1.

Act 125 is evaporating the solvent from the liquid primer. Act 127 is curing. If the liquid primer is used, act 127 may cure both the primer and the powder coating. In some embodiments, the curing process causes the powder particles to sinter without flowing sufficiently to entirely lose their discrete identities. For example, the cured surface of the coating 2 may have bumps each of which corresponds to an individual particle of the powder.

Act 128A is fitting the radial shaft seal repair sleeve 61 on the shaft 1. In some embodiments, act 128A comprises press fitting. In some embodiment, the powder coating 2 is formed on the radial shaft seal repair sleeve 61 prior to act 128A. Optionally, however, some or all of the acts of forming the coating 2 may be carried out after installing the radial shaft seal repair sleeve 61 on the shaft 1. It is generally more convenient to apply the coating 2 to the radial shaft seal repair sleeve 61 prior to fitting the radial shaft seal repair sleeve 61 on the shaft 1. In fact, it may be desirable to use the radial shaft seal repair sleeve 61 not to make a repair, but in the original assembly of the machine 10.

The process 140 may continue with act 129, completing the assembly of the radial shaft seal such that the sealing lip 17 mates with the coating 2 and with act 131, operating the machine 10 until the sealing lip 17 has worn the trench 8 into the powder coating 2.

Figure 13:
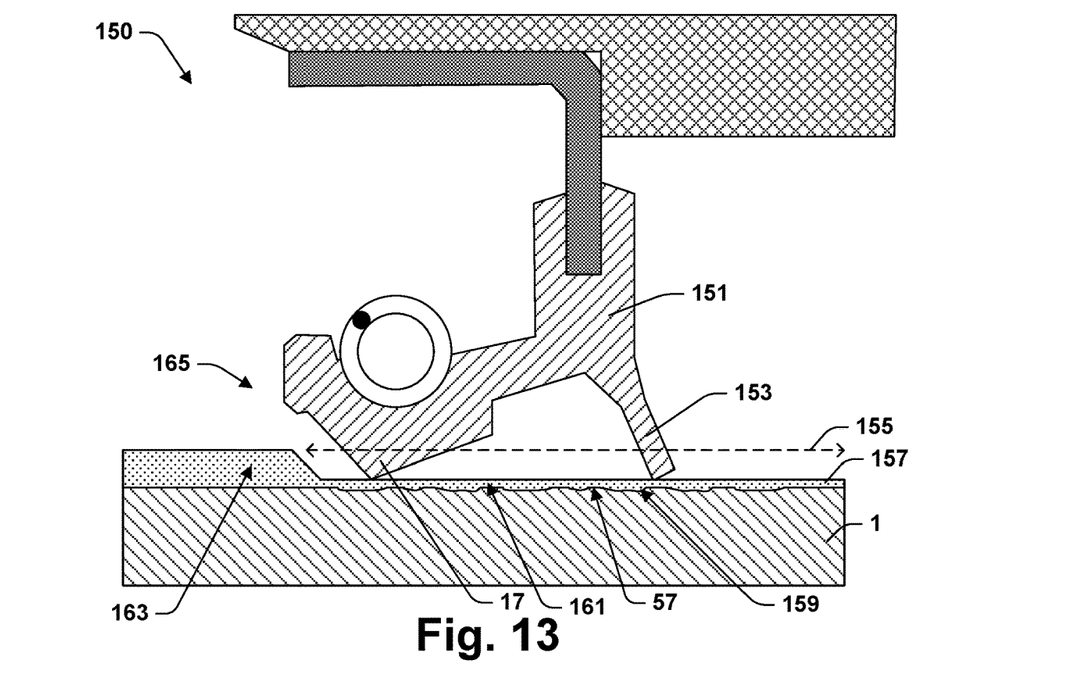
FIG. 13 illustrates a machine with a radial shaft seal for a reciprocating in accordance with some aspects of the present teachings.
Figure 14:
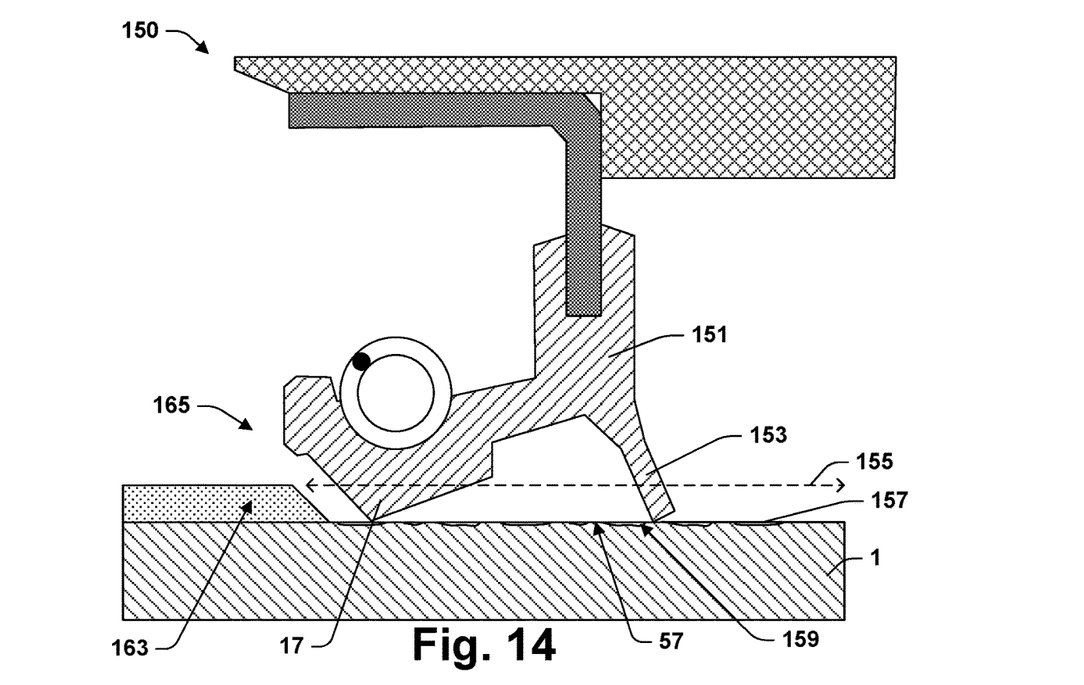
FIG. 14 illustrates the machine of FIG. 13 after further wear of the radial shaft seal.

A radial shaft seal according to the present teachings may be a rotary shaft seal, an oscillatory shaft seal, or a reciprocating shaft seal, the type depending on the way in which the shaft moves under the sealing lip. FIG. 14 illustrates a machine 150 having a radial shaft seal 165 that is a reciprocating shaft seal according to some aspects of the present teachings. The radial shaft seal 165 comprises a nitrile ring 151 that includes a sealing lip 17 and a dust lip 153. The seal lip 17 reciprocates in a direction 155 along a length of the shaft 1. The sealing lip 17 contacts a powder coating 157 that may be in composition and thickness like the previously described powder coating 2. In conjunction with the powder coating 157, the sealing lip 17 forms an oil seal.

The powder coating 157 is formed over an outer surface 57 of the shaft 1. The shaft 1 may have a pitted surface including pits 159 that are filled by the powder coating 157. The pits 159 may be formed in chrome plating or the like on the shaft 1. The powder coating 157 may have a low area 161 having a reduced thickness due to a wearing effect of the sealing lip 17 and a high area 163 beyond a range of motion of the sealing lip 17.

FIG. 14 illustrates the radial shaft seal 165 in the machine 150 after further wear. As shown in FIG. 14, the powder coating 157 may wear through until the outer surface 57 is exposed. Wear may stop at this point, as the sealing lip is supported by the outer surface 57, which may be harder than the powder coating 157. The pits 159 remain filled with the powder coating 157, whereby the oil sealing functionality of the radial shaft seal 165 is sustained.

The components and features of the present disclosure have been shown and/or described in terms of certain embodiments and examples. While a particular component or feature, or a broad or narrow formulation of that component or feature, may have been described in relation to only one embodiment or one example, all components and features in either their broad or narrow formulations may be combined with other components or features to the extent such combinations would be recognized as logical by one of ordinary skill in the art.

The invention claimed is:

1. A radial shaft seal, comprising:
a powder coating over an outer surface of a shaft; and
a sealing lip abutting the powder coating and forming a radial shaft seal;
wherein the powder coating is of the type formed by powder coating with particles individually comprising a thermosetting resin and a filler material that is a solid lubricant having a melting point above a cure temperature of the thermosetting resin;
the powder coating comprises a first layer proximate the shaft and a second layer more distal from the shaft; and
the first layer is more wear resistant that the second layer.

2. The radial shaft seal of claim 1, wherein the filler material is present in each of the particles in an amount from about 15 to about 35 volume percent based on the volume of the particle.

3. The radial shaft seal of claim 1, wherein the powder coating has a thickness greater than 20 μm.

4. The radial shaft seal of claim 1, wherein the powder coating is the product of a process, the process comprising:
melt-mixing the thermosetting resin and the filler material to form a composite;
cooling the composite; and
breaking up the cooled composite to form the powder of particles;
wherein the powder coating has a structure formed by curing the powder of particles in such a way that the particles sinter but do not flow sufficiently to entirely lose their discrete identities.

5. The radial shaft seal of claim 1, wherein the powder coating is the product of a process, the process comprising:
applying a coating of the powder of particles over the outer surface, wherein the particles each contain the thermosetting resin and the filler material; and
curing the powder of particles to form the powder coating, wherein the powder coating comprises a porous layer formed from the particles of the powder of particles adhered to one-another.

6. The radial shaft seal of claim 5, further comprising:
applying a liquid primer over the outer surface;
wherein the liquid primer comprises a second thermosetting resin and a solvent;
applying the coating of the powder of particles over the outer surface comprises applying the coating of the powder of particles over the liquid primer prior to drying or curing the liquid primer; and
curing the powder of particles comprises curing the liquid primer and the powder of particles to form a dry powder film lubricant, wherein the dry powder film lubricant comprises a polymer matrix formed from the second thermosetting resin in a layer proximate the outer surface.

7. The radial shaft seal of claim 1, wherein:
the sealing lip is disposed within a trench worn through the powder coating;
the sealing lip abuts the outer surface within the trench; and
the sealing lip mates with the powder coating on a side of the trench.

8. The radial shaft seal of claim 1, wherein the sealing lip is one of a plurality of sealing lips that mate with a plurality of trenches in the powder coating to form a labyrinth seal.

9. A radial shaft seal repair sleeve, comprising:
a radial shaft seal repair sleeve having a cylindrical outer surface; and
a powder coating on the cylindrical outer surface;
wherein the powder coating is formed of particles comprising a thermosetting resin and a filler material having a melting point above a cure temperature of the thermosetting resin; and
the powder coating has a structure formed by curing the particles in such a way that the particles sinter but do not flow sufficiently to entirely lose their discrete identities; and
the radial shaft seal repair sleeve is free from any shaft or is installed on a shaft that is worn beneath the radial shaft seal repair sleeve;
wherein the powder coating comprises a first layer proximate the cylindrical outer surface and a second layer more distal from the cylindrical outer surface, and the first layer is more wear resistant that the second layer.

10. The radial shaft seal repair sleeve of claim 9, wherein the powder coating has a porosity in the range from 2%-80%.

11. The radial shaft seal repair sleeve of claim 9, wherein the filler material is present in each of the particles in an amount from about 15 to about 35 volume percent based on the volume of the particle.

12. The radial shaft seal repair sleeve of claim 9, wherein the radial shaft seal repair sleeve has a cylindrical inner surface that is free from the powder coating.

* * * * *